J. VAN MILL, Jr.
SCORING ATTACHMENT FOR VENEER LATHES.
APPLICATION FILED JULY 29, 1911.
1,027,298.
Patented May 21, 1912.
2 SHEETS—SHEET 2.
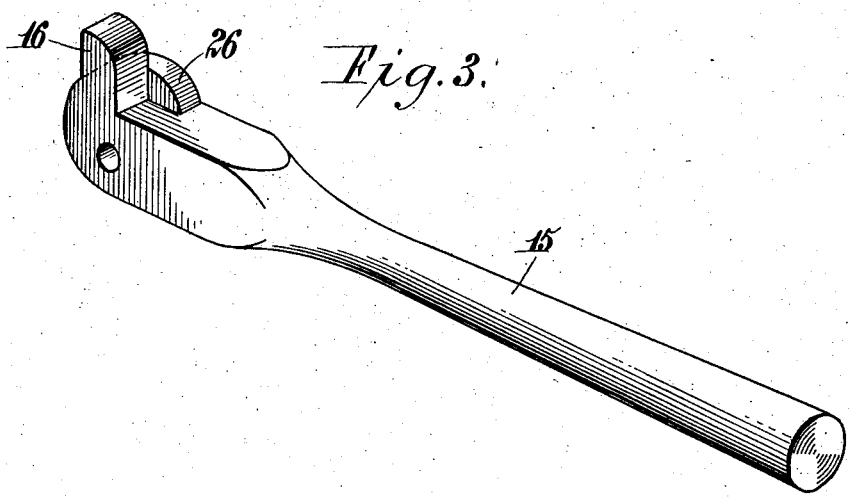
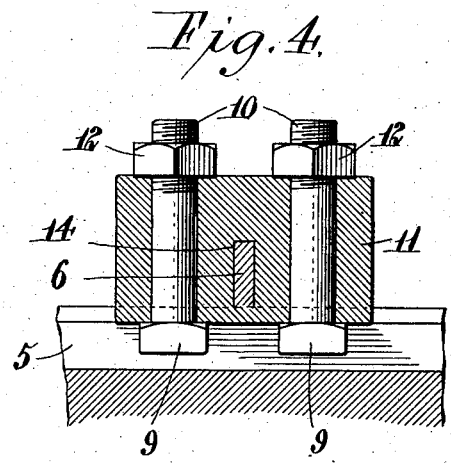

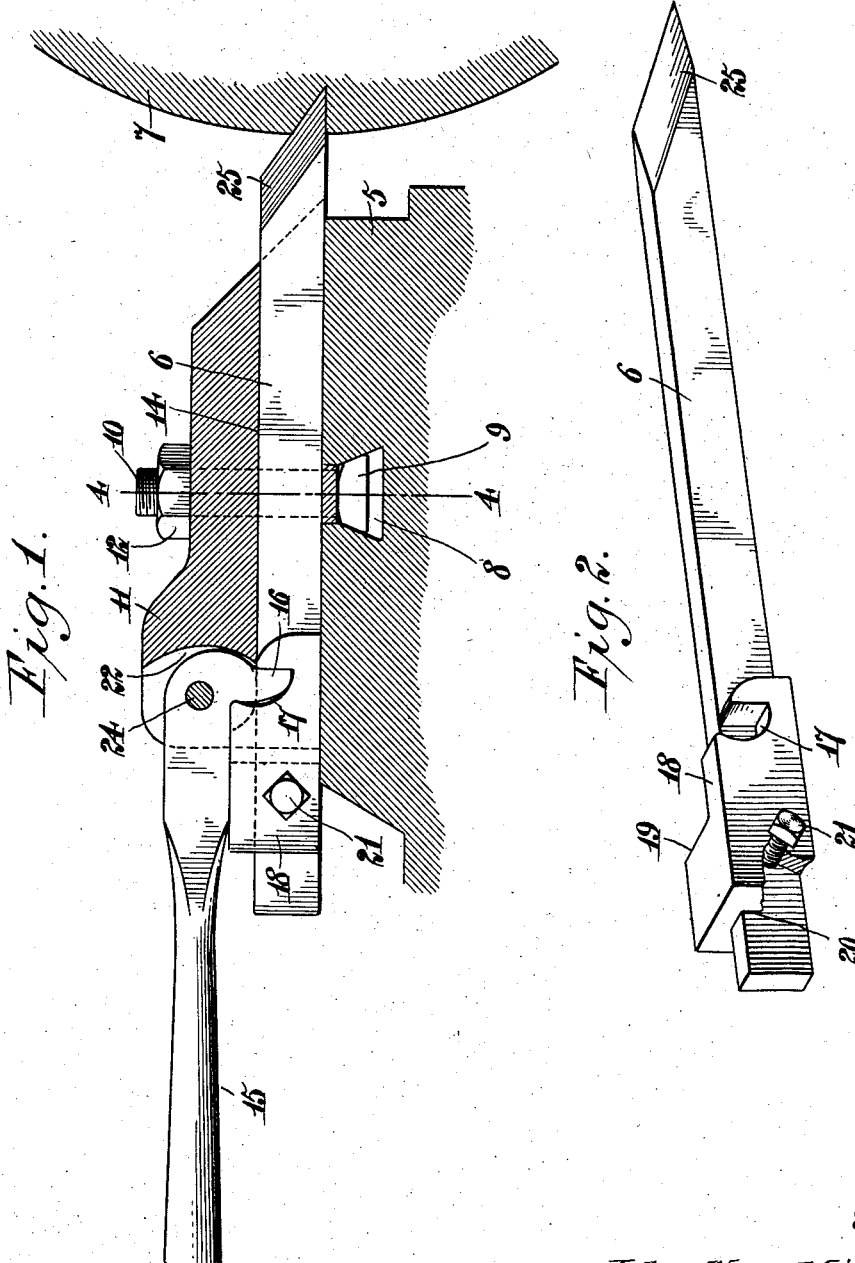

UNITED STATES PATENT OFFICE.

JOHN VAN MILL, JR., OF GLADSTONE, MICHIGAN.

SCORING ATTACHMENT FOR VENEER-LATHES.

1,027,298.  Specification of Letters Patent.  Patented May 21, 1912.

Application filed July 29, 1911. Serial No. 641,190.

*To all whom it may concern:*

Be it known that I, JOHN VAN MILL, Jr., a citizen of the United States, residing at Gladstone, in the county of Delta and State of Michigan, have invented new and useful Improvements in Scoring Attachments for Veneer-Lathes, of which the following is a specification.

The general object of the invention is to facilitate the operation of securing in their adjusted positions on a veneer lathe the scoring tool and the stock or carrier therefor.

Other objects will appear and be better understood from the following description taken in connection with the accompanying drawings, in which, Figure 1 is a vertical section of the device applied in operative position on a veneer cutting lathe. Fig. 2 is a detail perspective of the scoring tool with a portion of the head thereof broken away. Fig. 3 is a perspective of the operating lever. Fig. 4 is a cross section on the line 4—4 of Fig. 1.

5 designates a portion of the bed plate of an ordinary veneer cutting lathe. 6 the usual scoring knife, and 7 a fragment of a log which is being scored by the knife 6. A dove-tail recess 8 in the bed plate 5 receives the beveled heads 9 of clamp bolts 10 which extend through the stock 11 and are held by nuts 12. The scoring knife 6 slides in a recess 14 opening through the bottom and opposite ends of the stock 11 and is actuated to do so by an operating lever 15 having a tooth 16 which is received by a notch 17 formed in a head 18 which latter has an offset portion 19 provided with a recess 20 to receive the knife or scoring tool 6 and an adjusting screw 21 screwed into an opening in one side of the head is adapted to bind on the scoring tool so as to adjustably secure the head 18 thereto. The toothed end of the lever 15 is rounded and arranged in a vertical recess 22 formed in one end of the stock and communicating with the recess 14, and has an eccentric hole to receive a pivot pin 24 passing transversely through the stock 11. When the lever is depressed as shown in Fig. 1 the sharpened end 25 of the scoring knife 6 is projected beyond one end of the stock and into engagement with the work. When the operating lever is moved upwardly from the stock the tooth thereof retracts the scoring tool. By adjustably securing the head at points nearer the rear end of the tool than that shown in Fig. 1 the said tool will penetrate the work for a greater distance. A cam extension 26 on the pivoted end portion of the lever and to one side of the tooth 16 presses downwardly on the scoring tool while the lever is being depressed to the position in Fig. 1. This has the effect of moving the stock away from the bed plate 5 and thus causing the beveled heads 9 of the bolts to wedge in the dove-tail recess 8 and lock the stock against sliding movement on the bed plate, this locking of the stock takes place at the time the tool or knife is fully projected.

In use any number of the devices may be connected to the bed plate of the lathe and when the levers thereof are moved outwardly, may be adjusted on the bed plate by sliding the stocks through the dove-tail recess of said bed plate. After the stocks are positioned opposite to the portions which are desired to be scored on the log and after the scoring tools are adjusted so as to enter the log to a predetermined depth, the levers are depressed whereupon the parts will be locked in their adjusted positions as previously described.

Although I have shown and described one embodiment of my invention it is to be understood that I am not to be limited to the specific structure herein shown and claimed nor to the particular arrangement of the parts since it will be seen that various changes may be made, in the scope of the appended claims without departing from the spirit or sacrificing any of the advantages of the invention.

What I claim as new is:

1. In a scoring device for veneer lathes, in combination with a bed plate, a stock adjustable thereon, and a scoring tool adjustable on the stock; of a lever pivoted to the stock and adapted to adjust the scoring tool and simultaneously lock the stock and scoring tool in their adjusted positions.

2. In a scoring device for veneer lathes, in combination with a stock, and a movable scoring tool carried thereby; of means for moving the scoring tool and including a head adjustably secured to the tool, and an operating lever adapted to engage the head and pivoted to the stock.

3. In a scoring device for veneer lathes, in combination with a stock, and a movable scoring tool carried thereby; of means for moving the scoring tool and including a head adjustably secured to the tool, and an operating lever pivoted to the stock and having a tooth interlocked with the head.

4. In a scoring device for veneer lathes, in combination with a stock, and a movable scoring tool carried thereby; of means for moving the scoring tool and including a head adjustably secured to the tool and an operating lever pivoted to the stock and having a tooth interlocked with the head and further having a cam adapted to bind on the tool when the lever is in one position, for the purpose described.

In testimony whereof I affix my signature in presence of two witnesses.

JOHN VAN MILL, Jr.

Witnesses:
   FRANCIS GAGNON,
   MIKE MUELLER.

Copies of this patent may be obtained for five cents each, by addressing the "Commissioner of Patents, Washington, D. C."